(12) United States Patent
Marupaduga et al.

(10) Patent No.: US 11,252,770 B1
(45) Date of Patent: Feb. 15, 2022

(54) MASSIVE MIMO PAIRING CRITERIA ADJUSTMENTS

(71) Applicant: Sprint Spectrum LP, Overland Park, KS (US)

(72) Inventors: Sreekar Marupaduga, Overland Park, KS (US); Rajveen Narendran, Olathe, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 85 days.

(21) Appl. No.: 16/777,109

(22) Filed: Jan. 30, 2020

(51) Int. Cl.
*H04W 76/14* (2018.01)
*H04B 17/382* (2015.01)
*H04L 12/26* (2006.01)
*H04B 7/0452* (2017.01)
*H04W 28/02* (2009.01)
*H04B 17/309* (2015.01)
*H04L 5/00* (2006.01)
*H04W 24/08* (2009.01)
*H04W 24/02* (2009.01)

(52) U.S. Cl.
CPC .......... *H04W 76/14* (2018.02); *H04B 7/0452* (2013.01); *H04B 17/309* (2015.01); *H04B 17/382* (2015.01); *H04L 5/0053* (2013.01); *H04L 43/16* (2013.01); *H04W 24/02* (2013.01); *H04W 24/08* (2013.01); *H04W 28/0205* (2013.01)

(58) Field of Classification Search
CPC ... H04W 76/14; H04B 7/0452; H04B 17/309; H04B 17/382
See application file for complete search history.

(56) References Cited

U.S. PATENT DOCUMENTS

| | | | |
|---|---|---|---|
| 9,698,889 B2 | 7/2017 | Xue et al. | |
| 10,742,296 B2 * | 8/2020 | He | H04B 7/0632 |
| 2011/0044272 A1 | 2/2011 | Cui et al. | |
| 2015/0245360 A1 * | 8/2015 | Gao | H04B 7/0452 |
| | | | 370/329 |
| 2016/0308593 A1 * | 10/2016 | Zhu | H04B 7/0617 |
| 2016/0338080 A1 * | 11/2016 | Gao | H04W 72/00 |
| 2018/0269945 A1 * | 9/2018 | Zhang | H04W 76/27 |
| 2020/0252807 A1 * | 8/2020 | Han | H04B 7/0617 |
| 2020/0367230 A1 * | 11/2020 | Raghavan | H04W 72/048 |

* cited by examiner

*Primary Examiner* — Jamal Javaid
*Assistant Examiner* — Ryan C Kavleski

(57) ABSTRACT

A pairing efficiency and/or a resource usage associated with wireless devices attached to a sector are monitored. Responsive to determining that the pairing efficiency is below a threshold and/or the resource usage is higher than a threshold, one or more pairing criteria are adjusted to increase MIMO pairing, thereby exploiting the benefits of massive MIMO in wireless networks.

17 Claims, 5 Drawing Sheets

MASSIVE MIMO PAIRING CRITERIA ADJUSTMENTS

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. Wireless networks may be configured to utilize multiple-input-multiple-output (MIMO), in which multiple data streams can be directed towards one or more eligible wireless devices via various combinations of antennae and transceivers based on the orthogonality of transmission, thereby maximizing resources. Further, massive MIMO extends this concept to antenna arrays coupled to these base stations, the antenna arrays comprising large numbers of controllable antenna elements that enable directing several MIMO streams to various groups or "pairings" of wireless devices. Massive MIMO has been identified as one of the promising air interface technologies to address the capacity requirement required demanded by 5G networks.

Overview

Exemplary embodiments described herein include methods, systems, and processing nodes for increasing or reducing MIMO pairing based on a combination of a pairing efficiency and a resource usage. An exemplary method for performing MIMO includes monitoring a pairing efficiency of one or more wireless devices in a wireless network and, responsive to determining that the pairing efficiency is below a first threshold, adjusting one or more pairing criteria, wherein adjusting the one or more pairing criteria results in increasing the pairing efficiency.

An exemplary system for performing MIMO includes a processing node, and a processor coupled to the processing node. The processor can be configured to perform operations including monitoring a MIMO pairing efficiency and a resource usage associated with an access node in a wireless network and, responsive to determining that the MIMO pairing efficiency is below a first threshold and the resource usage is above a second threshold, adjusting one or more pairing criteria such that the pairing efficiency is increased or the resource usage is reduced.

An exemplary processing node for performing MIMO is configured to perform operations including monitoring a pairing efficiency and a resource usage associated with wireless devices attached to a sector, responsive to determining that the pairing efficiency is below a first threshold and the resource usage is higher than a second threshold, adjusting one or more pairing criteria to increase MIMO pairing and, responsive to determining that the pairing efficiency is above a third threshold and the resource usage is below a fourth threshold, adjusting one or more pairing criteria to reduce MIMO pairing.

DETAILED DESCRIPTION

The embodiments illustrated herein describe methods and systems whereby pairing criteria for MIMO in a wireless network are adjusted to encourage or discourage pairing based on monitoring pairing efficiency and resource consumption. For example, a pairing efficiency metric (based on, for instance, a percentage of wireless devices participating in MIMO) and/or a resource usage (based on, for instance, percentage of total resources used by the wireless devices) are monitored to determine whether or not they cross one or more thresholds. If the pairing efficiency falls below a threshold, and if the resource usage rises above a threshold, then the pairing criteria are adjusted to increase or encourage MIMO pairing. Further, if the pairing efficiency rises above a threshold, and the resource usage falls below a threshold, then the pairing criteria are adjusted to reduce or discourage MIMO pairing. Different sets of thresholds may be used to determine whether or not to encourage or discourage pairing. Further, the pairing criteria can include an angular separation required for MIMO pairing, a threshold data buffer requirement at an access node, or a number of wireless devices eligible to join a multi-user MIMO (MU-MIMO) group. In other words, MIMO criteria are loosened or tightened based on a combination of pairing efficiency and resource usage. These and additional operations are further described with respect to the embodiments depicted in FIGS. 1-6 below.

Figure 1:
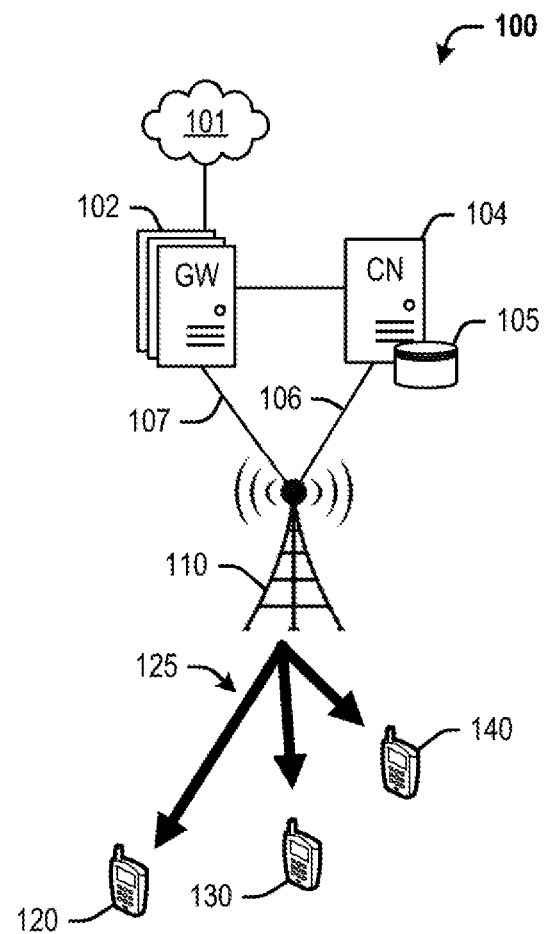
FIG. 1 depicts an exemplary system for performing MIMO.

FIG. 1 depicts an exemplary system 100 for performing massive MIMO in a wireless network. System 100 comprises a communication network 101, gateway node(s) 102, controller node 104, access node 110, and wireless devices 120, 130, 140. Access node 110 can be any network node configured to provide communication between end-user wireless devices 120, 130, 140 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, a next generation or gigabit NodeB device (gNBs) in 5G networks, or the like. In other embodiments, access node 110 can be a small access node including a microcell access node, a picocell access node, a femtocell access node, or the like such as a home NodeB or a home eNodeB device. Moreover, it is noted that while access node 110 and wireless devices 120, 130, 140 are illustrated in FIG. 1, any number of access nodes and wireless devices can be implemented within system 100.

By virtue of comprising a plurality of antennae as further described herein, access node 110 can implement various transmission modes or operating modes within its coverage area, including multiple-input-multiple-output (MIMO), single user MIMO (SU-MIMO), multi-user MIMO (MU-MIMO), beamforming, etc. In an exemplary embodiment, access node 110 may utilize hundreds of antennae to simultaneously transmit each of a plurality of different data streams (such as MIMO data stream 125) to a corresponding plurality of wireless devices (such as wireless devices 120, 130, 140). In other words, wireless devices 120, 130, 140 may be participating in a MIMO group (by virtue of meeting certain "pairing" criteria). Qualifying for MIMO may be based on, for instance, an orthogonality of transmission (in other words, angular separation), so as to maximize resources of a loaded access node, as well as a total number of wireless devices allowed per MIMO group, or a size of a buffer on access node 110. In other examples, one or more criteria for pairing wireless devices for MIMO (or including the wireless devices into an existing MIMO group) include a channel orthogonality (i.e., non-overlapping and non-interfering channels) above a set threshold, which may be achieved by assigning cyclic shifts allocated to, for example, a Demodulation Reference Signal ("DM-RS") to differentiate parallel data streams, as well as having a SINR above a threshold. Qualifying wireless devices may have an assigned precoder that is orthogonal to other qualifying wireless devices. In an exemplary embodiment, downlink transmission schemes of access node 110 (and/or other access nodes not shown herein) may be supported at a physical layer by a set of downlink reference signals. These reference signals can be specific to wireless devices 120, 130, 140, i.e., DM-RS, or specific to geographical areas of access node 110 or sector 115, i.e., Common Reference Signals ("CRS"). DM-RS' are pre-coded signals used for demodulation purposes on scheduled PRBs. For example, a pre-coding module of access node 110 may apply pre-coding to data transmissions targeted to wireless devices 120, 130, 140 based on channel feedback received from said wireless devices including RI, CQI, and PMI. CRS' are not pre-coded signals and are used by wireless devices 120, 130, 140 for channel estimation. To fully exploit MU-MIMO mode, data/spatial streams intended to/from access node 110 and/or wireless devices 120, 130, 140 need to be well separated and orthogonal at both Tx/Rx sides. Optimal pre-coding for MU-MIMO mode at, for example, a pre-coding module of access node 110, may include Dirty Paper Coding ("DPC") combined with user scheduling and power loading. Additional pre-coding techniques may include Channel Inversion ("CI"), e.g., to cancel interference, and/or Regularized Channel Inversion ("RCI"), e.g., to attenuate interference.

Further, access node 110 (or any other entity within system 100) may be configured to execute a method including monitoring a pairing efficiency of one or more wireless devices 120-140 and, responsive to determining that the pairing efficiency is below a first threshold, adjusting one or more pairing criteria to increase the pairing efficiency. In an exemplary embodiment, monitoring a pairing efficiency can include determining one or more performance metrics of access node 110 and wireless devices 120-140 (and MIMU groups thereof). Generally, the performance metrics can be based on one or more of a size of each MIMO group comprising the eligible wireless devices 120-140, a quantity of eligible wireless devices 120-140 participating in the MIMO groups, a percentage of total wireless devices attached to the access node 110 (including but not limited to wireless devices 120-140), a throughput of each of the one or more MIMO groups in the sector, an average throughput of each MIMO group or each wireless device in each MIMO group, or an aggregate throughput (i.e. total throughput) of all MIMO signals within the sector (including but not limited to MIMO signal 125). Performance metrics and/or pairing efficiency can further be based on historical and/or current information related to a quantity of successful pairings, trends of the signal characteristics, and so on. For example, the historical trends may be monitored and recorded at time intervals, and the pairing efficiency based on the recorded historical trends. Thus, at certain time intervals, the pairing efficiency is monitored when adjusting the MIMO criteria as described herein. Generally, the pairing efficiency tracks how successfully and efficiently the MIMO groups are utilizing the available resources.

Thus, upon determining that the pairing efficiency is below a threshold, it can be increased by adjusting pairing criteria to force or encourage pairing of wireless devices that may not normally be paired for MIMO. For example, adjusting the one or more pairing criteria can include reducing an angular separation required for MIMO pairing, which can ensure that more wireless devices are eligible to join MIMO groups, versus default criteria wherein the same wireless devices would not have qualified based on angular separation. In another example, adjusting the one or more pairing criteria can include reducing a threshold data buffer requirement for MIMO pairing at the access node 110. Since the data buffer for downlink MIMO streams usually needs to be large enough to support increasing numbers of wireless devices, reducing this requirement can ensure that more wireless devices can join MIMO groups associated with the MIMO streams, whereas such wireless devices may otherwise not be allowed to join the MIMO groups despite otherwise qualifying (based on angular separation, etc.). In another example, adjusting the one or more pairing criteria can include reducing a minimum number of wireless devices required to join a MIMO group. For example, where a default criteria would require that at least 4 eligible wireless devices must be attached to access node 110 before a MIMO group may be formed, the adjusted criteria can be set to a minimum of 2 eligible wireless devices. Similarly, if the default criteria would require that at least 8 eligible wireless devices are required to form a MIMO group (as is the case for higher-order MIMO systems), the adjusted criteria could reduce this minimum number to 4 eligible devices. Thus, in an exemplary embodiment, the minimum number of eligible wireless devices required to form a group is reduced by half. In general, this reduction of criteria can initiate creation of more groups, so more wireless devices can be paired, and more pairs or groups can be formed.

Further, a resource usage of the access node 110 can be monitored, and pairing criteria can be adjusted responsive to determining that the resource usage meets a threshold. This can be performed independently or in conjunction with the adjustments based on the pairing efficiency described above. For example, as resource usage tends to increase, it may be more efficient to encourage MIMO pairing even for those wireless devices that would not be eligible for MIMO based on default criteria. Thus, adjusting the criteria (for example, as described above) to encourage pairing can result in lower resource consumption. In an exemplary embodiment, the resources comprise air-interface resources deployed by access node 110, and the one or more pairing criteria are adjusted responsive further to determining that the usage of the air-interface resources exceeds a threshold. The usage may be based on a percentage of air-interface resources (such as, for example, percentage of physical resource blocks utilized versus unutilized), a percentage usage over a time period (such as, for example, resource blocks used per unit time), etc. In an exemplary embodiment, a resource usage threshold can comprise 75% of physical resource blocks available in a wireless air interface being utilized per time unit, e.g. a a transmission time interval, or a few seconds, or a minute. In this case, the pairing criteria can be adjusted to encourage pairing, and the monitoring continued until a second threshold is reached, after which the adjustment stops, or the criteria are reverted back to a default criteria. For example, when the resources used per unit time reach 50% of physical resource blocks (per TTI, second, etc.), then the adjustment of pairing criteria can be reversed.

Although system 100 shows one access node 110 serving three wireless devices 120, 130, 140, the disclosed methods may be executed in any wireless network comprising any number of access nodes and wireless devices. For example, operations described herein may be performed by a controller node 104 that can be in communication with a plurality of access nodes including access node 110. The operations described herein can be performed by a processing node (as further described in FIG. 2), communicatively coupled to an access node 110, controller node 104, etc. In an exemplary embodiment, a system (and/or a processing node therein) can be configured to perform the monitoring and adjusting steps for any number of wireless devices attached to a plurality of wireless sectors deployed by one or more access nodes in the wireless network. For example, such a system may be configured to perform operations including monitoring a MIMO pairing efficiency and a resource usage associated with one or more access nodes in a wireless network and, responsive to determining that the pairing efficiency is below a first threshold and the resource usage is above a second threshold, adjusting one or more pairing criteria such that the pairing efficiency is increased or the resource usage is reduced.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless devices 120, 130, 140 may be any device, system, combination of devices, or other such communication platform capable of communicating wirelessly with access node 110 using one or more frequency bands deployed therefrom. Wireless devices 120, 130, 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 121, 122, etc. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communications links 106, 107 may include 51 communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to MIMO performance related to access node 110 and wireless devices 120, 130, 140, selected BWP sizes and identifiers, etc. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, controller node 104, and/or network 101.

Figure 2:
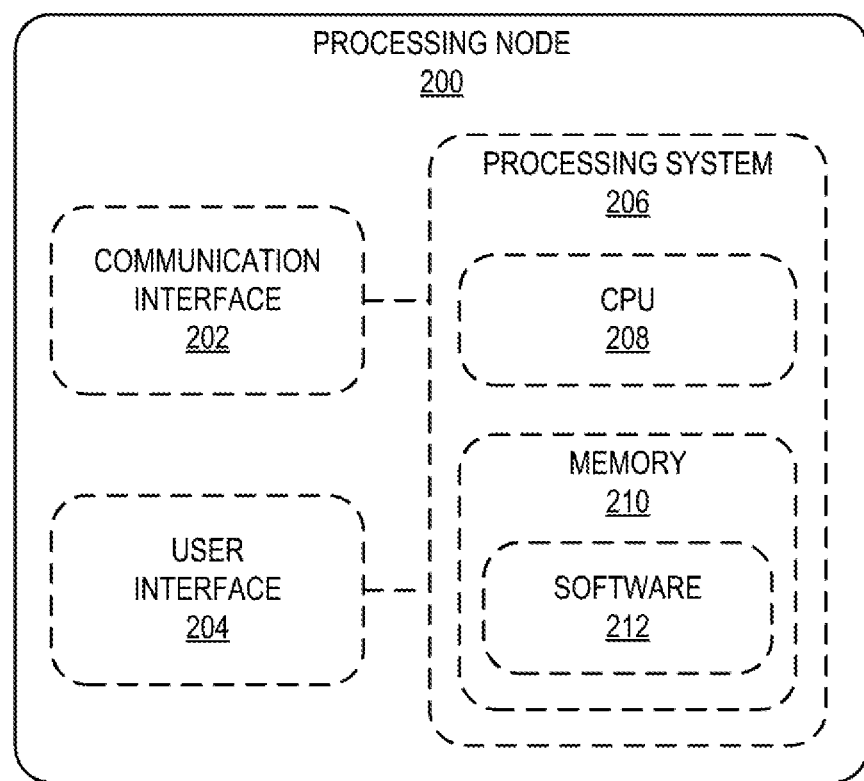
FIG. 2 depicts an exemplary processing node.

FIG. 2 depicts an exemplary processing node, comprising a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include logic for performing the operations described herein. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 210 includes logic for monitoring a pairing efficiency of one or more wireless devices in a wireless network and, responsive to determining that the pairing efficiency is below a first threshold, adjusting one or more pairing criteria, wherein adjusting the one or more pairing criteria results in increasing the pairing efficiency. In another exemplary embodiment, software 210 includes logic for monitoring a MIMO pairing efficiency and a resource usage associated with an access node in a wireless network and, responsive to determining that the MIMO pairing efficiency is below a first threshold and the resource usage is above a second threshold, adjusting one or more pairing criteria such that the pairing efficiency is increased or the resource usage is reduced. In another exemplary embodiment, software 210 includes logic for monitoring a pairing efficiency and a resource usage associated with wireless devices attached to a sector, responsive to determining that the pairing efficiency is below a first threshold and the resource usage is higher than a second threshold, adjusting one or more pairing criteria to increase MIMO pairing and, responsive to determining that the pairing efficiency is above a third threshold and the resource usage is below a fourth threshold, adjusting one or more pairing criteria to reduce MIMO pairing.

Figure 3:
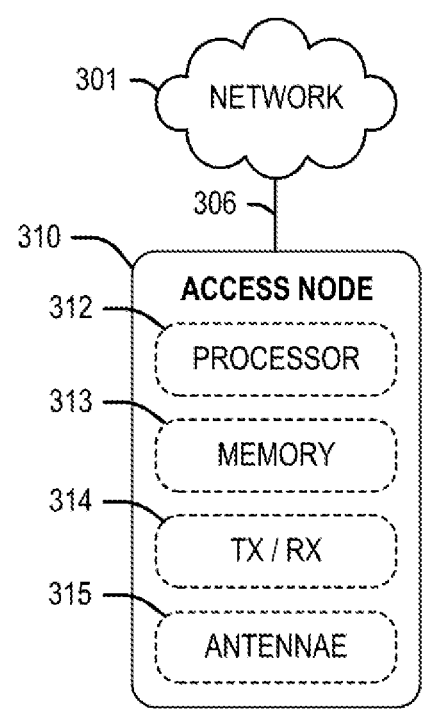
FIG. 3 depicts an exemplary access node.

FIG. 3 depicts an exemplary access node 310. Access node 310 is configured as an access point for providing network services from network 301 to end-user wireless devices such as wireless devices 120, 130, 140 in FIG. 1. Access node 310 is illustrated as comprising a memory 313 for storing logical modules that perform operations described herein, a processor 312 for executing the logical modules, and a transceiver 314 for transmitting and receiving signals via antennae 315. Combination of antennae 315 and transceiver 314 are configured to deploy a radio air interface in one or more sectors. Further, in each sector, the antennae 315 may be configured to operate in various operating modes (or transmit data in various transmission mode), such as MIMO (including SU-MIMO, MU-MIMO, and massive MIMO), beamforming, etc. Similarly, transceivers 314 include a plurality of transceivers that can deploy MIMO (and massive MIMO) data streams to end-user wireless devices, as well as to facilitate communication with other network nodes on network 301. Further, access node 310 is communicatively coupled to network 301 via communication interface 306, which may be any wired or wireless link as described above.

In an exemplary embodiment, memory 313 includes logic for monitoring a pairing efficiency of one or more wireless devices attached to access node 310 and, responsive to determining that the pairing efficiency is below a first threshold, adjusting one or more pairing criteria, wherein adjusting the one or more pairing criteria results in increasing the pairing efficiency. In another exemplary embodiment, memory 313 includes logic for monitoring a MIMO pairing efficiency and a resource usage associated with access node 310 and, responsive to determining that the MIMO pairing efficiency is below a first threshold and the resource usage is above a second threshold, adjusting one or more pairing criteria such that the pairing efficiency is increased or the resource usage is reduced. In another exemplary embodiment, memory 313 includes logic for monitoring a pairing efficiency and a resource usage associated with wireless devices attached to a sector deployed by access node 310, responsive to determining that the pairing efficiency is below a first threshold and the resource usage is higher than a second threshold, adjusting one or more pairing criteria to increase MIMO pairing and, responsive to determining that the pairing efficiency is above a third threshold and the resource usage is below a fourth threshold, adjusting one or more pairing criteria to reduce MIMO pairing.

Figure 4:
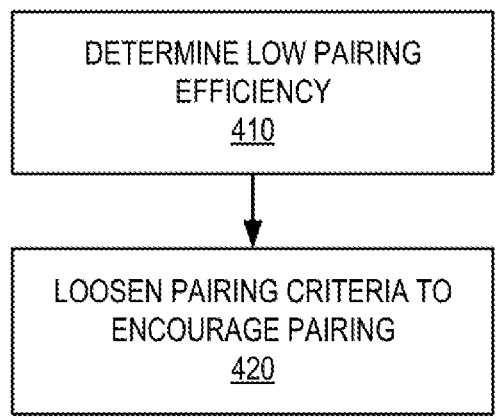
FIG. 4 depicts an exemplary method for performing MIMO based on pairing efficiency.

FIG. 4 depicts an exemplary method for performing MIMO based on pairing efficiency. The method of FIG. 4 is illustrated with respect to an access node, such as access node 110, 310, or a processing node, such as processing node 200. In other embodiments, the method can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, a pairing efficiency for one or more wireless devices, one or more wireless sectors, or one or more access nodes, is determined to be low. For example, a wireless network can include an access node configured to provide network access to one or more end-user wireless devices and can include a plurality of antennae to implement various transmission modes or operating modes within its coverage area, including MIMO, MU-MIMO, SU-MIMO, and massive MIMO. The wireless devices attached to the access node (or a sector thereof) can be "paired" or participate in a MIMO group by virtue of meeting one or more pairing criteria, such as an orthogonality of transmission or angular separation, a total number of wireless devices allowed per MIMO group, a minimum number of eligible wireless devices required to form a MIMO group, or a size of a downlink buffer on the access node. Thus, determining that the pairing efficiency is low can be based on one or more of a size of each MIMO group comprising the eligible wireless devices, a quantity of eligible wireless devices participating in the MIMO groups, a percentage of total wireless devices attached to the access node, a throughput of each of the one or more MIMO groups in the sector, an average throughput of each MIMO group or each wireless device in each MIMO group, or an aggregate throughput (i.e. total throughput) of all MIMO signals within the sector. Performance metrics and/or pairing efficiency can further be based on historical and/or current information related to a quantity of successful pairings, trends of the signal characteristics, and so on. For example, the historical trends may be monitored and recorded at time intervals, and the pairing efficiency based on the recorded historical trends. Thus, at certain time intervals, the pairing efficiency is monitored when adjusting the MIMO criteria as described herein. Generally, the pairing efficiency tracks how successfully and efficiently the MIMO groups are utilizing the available resources.

Thus, at 420, upon determining that the pairing efficiency is low, one or more pairing criteria are loosened to encourage pairing. Encouraging pairing can include adjusting pairing criteria to force pairing of wireless devices that may not normally be paired for MIMO. For example, adjusting the one or more pairing criteria can include reducing an angular separation required for MIMO pairing, which can ensure that more wireless devices are eligible to join MIMO groups, versus default criteria wherein the same wireless devices would not have qualified based on angular separation. In another example, adjusting the one or more pairing criteria can include reducing a threshold data buffer requirement for MIMO pairing at the access node. Since the data buffer for downlink MIMO streams usually needs to be large enough to support increasing numbers of wireless devices, reducing this requirement can ensure that more wireless devices can join MIMO groups associated with the MIMO streams, whereas such wireless devices may otherwise not be allowed to join the MIMO groups despite otherwise qualifying (based on angular separation, etc.). In another example, adjusting the one or more pairing criteria can include reducing a minimum number of wireless devices required to join a MIMO group. For example, where a default criteria would require that at least 4 eligible wireless devices must be attached to the access node before a MIMO group may be formed, the adjusted criteria can be set to a minimum of 2 eligible wireless devices. Similarly, if the default criteria would require that at least 8 eligible wireless devices are required to form a MIMO group (as is the case for higher-order MIMO systems), the adjusted criteria could reduce this minimum number to 4 eligible devices. Thus, in an exemplary embodiment, the minimum number of eligible wireless devices required to form a group is reduced by half. In general, this reduction of criteria can initiate creation of more groups, so more wireless devices can be paired, and more pairs or groups can be formed.

Figure 5:
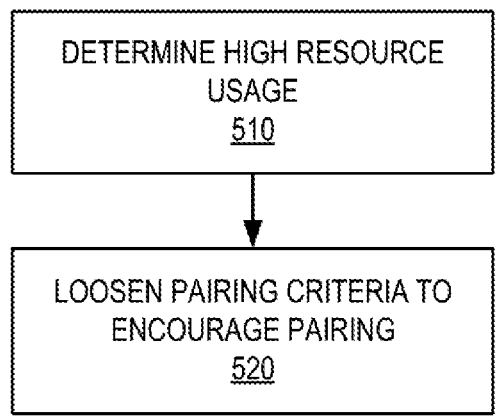
FIG. 5 depicts an exemplary method for performing MIMO based on resource usage.

FIG. 5 depicts an exemplary method for performing MIMO based on resource usage. The method of FIG. 5 is illustrated with respect to an access node, such as access node 110, 310, or a processing node, such as processing node 200. In other embodiments, the method can be implemented with any suitable network element. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, a high resource usage is determined for air-interface resources of an access node, a wireless sector, or generally a wireless network. For example, a wireless network can include an access node configured to provide network access to one or more end-user wireless devices and can include a plurality of antennae to implement various transmission modes or operating modes within its coverage area, including MIMO, MU-MIMO, SU-MIMO, and massive MIMO. The wireless devices attached to the access node (or a sector thereof) can be "paired" or participate in a MIMO group by virtue of meeting one or more pairing criteria, such as an orthogonality of transmission or angular separation, a total number of wireless devices allowed per MIMO group, a minimum number of eligible wireless devices required to form a MIMO group, or a size of a downlink buffer on the access node. As described herein, MIMO reduces resource consumption by allowing the same air-interface resources to be used for multiple data streams or sharing data streams to multiple wireless devices, by virtue of exploiting the orthogonality of the air-interface resources. The usage may be based on a percentage of air-interface resources (such as, for example, percentage of physical resource blocks utilized versus unutilized), a percentage usage over a time period (such as, for example, resource blocks used per unit time), etc. In an exemplary embodiment, a resource usage threshold can comprise 75% of physical resource blocks available in a wireless air interface being utilized per time unit, e.g. a transmission time interval, or a few seconds, or a minute.

Thus, at 520, the pairing criteria are loosened to encourage pairing. Encouraging pairing can include adjusting pairing criteria to force pairing of wireless devices that may not normally be paired for MIMO. For example, adjusting the one or more pairing criteria can include reducing an angular separation required for MIMO pairing, which can ensure that more wireless devices are eligible to join MIMO groups, versus default criteria wherein the same wireless devices would not have qualified based on angular separation. In another example, adjusting the one or more pairing criteria can include reducing a threshold data buffer requirement for MIMO pairing at the access node. Since the data buffer for downlink MIMO streams usually needs to be large enough to support increasing numbers of wireless devices, reducing this requirement can ensure that more wireless devices can join MIMO groups associated with the MIMO streams, whereas such wireless devices may otherwise not be allowed to join the MIMO groups despite otherwise qualifying (based on angular separation, etc.). In another example, adjusting the one or more pairing criteria can include reducing a minimum number of wireless devices required to join a MIMO group. As a result, it may be more efficient to encourage MIMO pairing even for those wireless devices that would not be eligible for MIMO based on default criteria. Thus, adjusting the criteria (for example, as described above) to encourage pairing can result in lower resource consumption.

Figure 6:
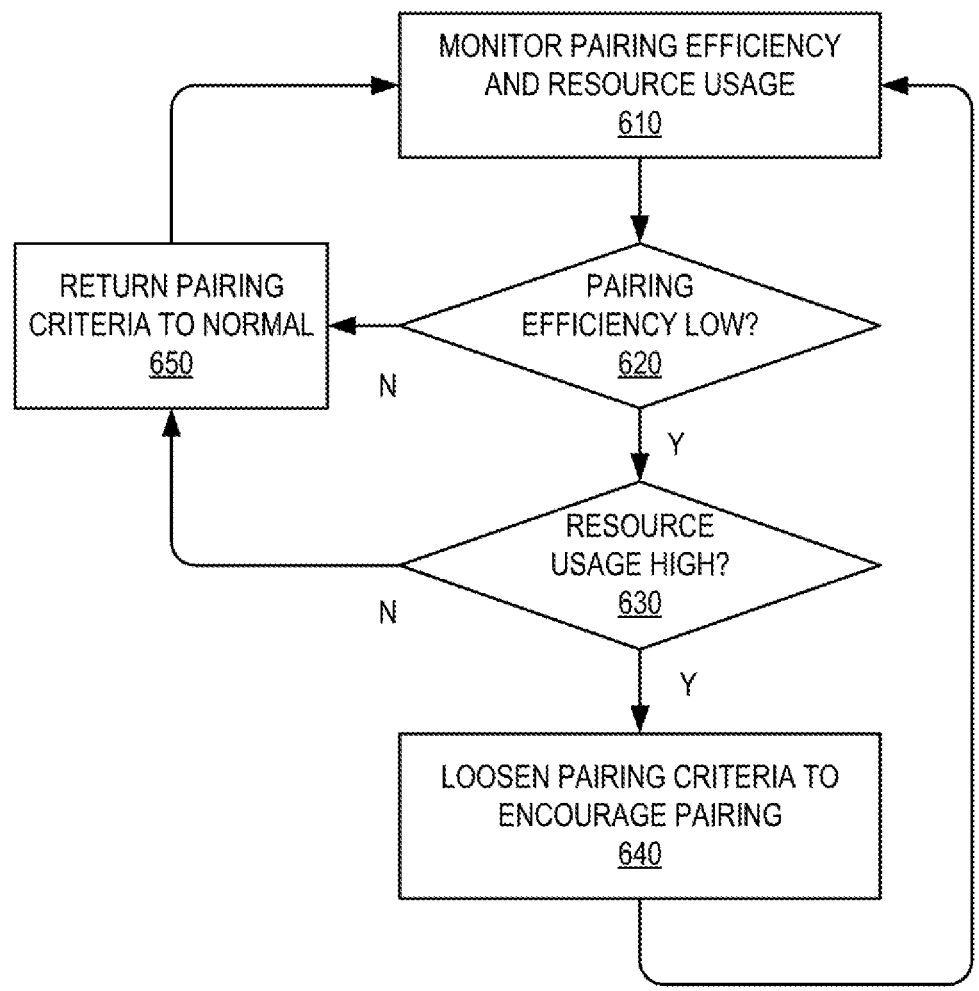
FIG. 6 depicts an exemplary method for performing MIMO based on pairing efficiency and resource usage.

FIG. 6 depicts an exemplary method for performing MIMO based on pairing efficiency and resource usage. The method of FIG. 6 is illustrated with respect to an access node, such as access node 110, 310, or a processing node, such as processing node 200. In other embodiments, the method can be implemented with any suitable network element. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, a pairing efficiency and resource usage for a wireless network are monitored. For example, a wireless network can include an access node configured to provide network access to one or more end-user wireless devices and can include a plurality of antennae to implement various transmission modes or operating modes within its coverage area, including MIMO, MU-MIMO, SU-MIMO, and massive MIMO. The wireless devices attached to the access node (or a sector thereof) can be "paired" or participate in a MIMO group by virtue of meeting one or more pairing criteria, such as an orthogonality of transmission or angular separation, a total number of wireless devices allowed per MIMO group, a minimum number of eligible wireless devices required to form a MIMO group, or a size of a downlink buffer on the access node. Thus, monitoring the pairing efficiency can be based on monitoring one or more of a size of each MIMO group comprising the eligible wireless devices, a quantity of eligible wireless devices participating in the MIMO groups, a percentage of total wireless devices attached to the access node, a throughput of each of the one or more MIMO groups in the sector, an average throughput of each MIMO group or each wireless device in each MIMO group, or an aggregate throughput (i.e. total throughput) of all MIMO signals within the sector. Performance metrics and/or pairing efficiency can further be based on historical and/or current information related to a quantity of successful pairings, trends of the signal characteristics, and so on. For example, the historical trends may be monitored and recorded at time intervals, and the pairing efficiency based on the recorded historical trends. Thus, at certain time intervals, the pairing efficiency is monitored when adjusting the MIMO criteria as described herein. Generally, the pairing efficiency tracks how successfully and efficiently the MIMO groups are utilizing the available resources. Further, monitoring the usage can be related to monitoring the pairing efficiency, as MIMO increases the spectral efficiency of air-interface resources, thereby reducing the usage. The usage may be based on a percentage of air-interface resources (such as, for example, percentage of physical resource blocks utilized versus unutilized), a percentage usage over a time period (such as, for example, resource blocks used per unit time), etc.

At 620 and 630, the pairing efficiency and resource usage are compared to thresholds to determine whether or not to adjust pairing criteria. For example, if it is determined at 620 that the pairing efficiency is low and at 630 that the resource usage is high, one or more pairing criteria are loosened at 640 to encourage pairing. Encouraging pairing can include adjusting pairing criteria to force pairing of wireless devices that may not normally be paired for MIMO. For example, adjusting the one or more pairing criteria can include reducing an angular separation required for MIMO pairing, which can ensure that more wireless devices are eligible to join MIMO groups, versus default criteria wherein the same wireless devices would not have qualified based on angular separation. In another example, adjusting the one or more pairing criteria can include reducing a threshold data buffer requirement for MIMO pairing at the access node. Since the data buffer for downlink MIMO streams usually needs to be large enough to support increasing numbers of wireless devices, reducing this requirement can ensure that more wireless devices can join MIMO groups associated with the MIMO streams, whereas such wireless devices may otherwise not be allowed to join the MIMO groups despite otherwise qualifying (based on angular separation, etc.). In another example, adjusting the one or more pairing criteria can include reducing a minimum number of wireless devices required to join a MIMO group. For example, where a default criteria would require that at least 4 eligible wireless devices must be attached to the access node before a MIMO group may be formed, the adjusted criteria can be set to a minimum of 2 eligible wireless devices. Similarly, if the default criteria would require that at least 8 eligible wireless devices are required to form a MIMO group (as is the case for higher-order MIMO systems), the adjusted criteria could reduce this minimum number to 4 eligible devices. Thus, in an exemplary embodiment, the minimum number of eligible wireless devices required to form a group is reduced by half. In general, this reduction of criteria can initiate creation of more groups, so more wireless devices can be paired, and more pairs or groups can be formed. Further, a resource usage can be compared with a threshold at 630, such as 75% of physical resource blocks available in a wireless air interface being utilized per time unit, e.g. a transmission time interval, or a few seconds, or a minute.

In an exemplary embodiment, the pairing criteria can be returned to normal at 650 upon determining that the pairing efficiency is not low at 620, and that the resource usage is not high at 630. This adjustment can be performed incrementally, with the method cycling through steps 610-640 during a time period, such as TTI, a few seconds, a minute, etc. Thus, the system constantly and in real-time monitors pairing efficiency and resource usage and adjusts pairing criteria accordingly. Further, different sets of thresholds can be used in steps 620 and 630 to determine whether the pairing efficiency is low or not, or whether the resource usage is high or not. For example, the pairing efficiency can be lower than a first threshold to progress to step 630, and higher than a second threshold to progress to step 650. Alternatively or on addition, the resource usage can be higher than a first threshold to progress to step 640, and lower than a second threshold to progress to step 650. Finally, the sequence of operations is merely exemplary, and those having ordinary skill in the art can alter the sequence of operations while maintaining the novel and nonobvious aspects presented in this disclosure. For example, the steps 620 and 630 may be performed in reverse order, without compromising the novel effects of adjusting pairing criteria in response to monitoring one or both of the pairing efficiency and the resource usage.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for performing massive multiple-input-multiple-output (MIMO) in a wireless network, the method comprising:
   monitoring a pairing efficiency and a resource usage associated with wireless devices attached to a sector;
   responsive to determining that the pairing efficiency is below a first threshold and the resource usage is higher than a second threshold; adjusting one or more pairing criteria to increase MIMO pairing; and
   responsive to determining that the pairing efficiency is above a third threshold and the resource usage is below a fourth threshold, adjusting one or more pairing criteria to reduce MIMO pairing.

2. The method of claim 1, wherein adjusting the one or more pairing criteria comprises reducing an angular separation required for MIMO pairing.

3. The method of claim 1, wherein adjusting the one or more pairing criteria comprises reducing a threshold data buffer requirement for MIMO pairing.

4. The method of claim 1, wherein adjusting the one or more pairing criteria comprises reducing a minimum number of wireless devices required to form a MIMO group.

5. The method of claim 4, further comprising reducing the minimum number by one half.

6. The method of claim 1, wherein the monitoring and adjusting steps are performed for wireless devices attached to a plurality of wireless sectors deployed by one or more access nodes in the wireless network.

7. A system for performing massive multiple-input-multiple-output (MIMO) in a wireless network, the system comprising:
   a processor; and
   a memory coupled to the processor, the memory to store instructions that are executed by the processor to perform operations comprising:
   monitoring a MIMO pairing efficiency and a resource usage associated with wireless devices attached to a sector; responsive to determining that the MIMO pairing efficiency is below a first threshold and the resource usage is above a second threshold, adjusting one or more pairing criteria to increase MIMO pairing; and
   responsive to determining that the MIMO pairing efficiency is above a third threshold and the resource usage is below a fourth threshold, adjusting one or more pairing criteria to reduce MIMO pairing.

8. The system of claim 7, wherein adjusting the one or more pairing criteria comprises reducing an angular separation required for MIMO pairing.

9. The system of claim 7, wherein adjusting the one or more pairing criteria comprises reducing a threshold data buffer requirement for MIMO pairing.

10. The system of claim 7, wherein adjusting the one or more pairing criteria comprises reducing a minimum number of wireless devices required to form a MIMO group.

11. The system of claim 7, wherein the operations further comprise:
    determining that the MIMO pairing efficiency meets the first threshold; and
    stopping the adjusting.

12. The system of claim 7, wherein the operations further comprise:
    determining that the resource usage falls below the second threshold; and
    stopping the adjusting.

13. The system of claim 7, wherein the resource usage comprises a percentage usage of physical resource blocks (PRBs) deployed by the access node.

14. The system of claim 7, wherein the pairing efficiency is associated with a spectral efficiency of air-interface resources deployed by the access node.

15. A processing node for performing massive multiple-input-multiple-output (MIMO) in a wireless network, the processing node being configured to perform operations comprising:
    monitoring a pairing efficiency and a resource usage associated with wireless devices attached to a sector;
    responsive to determining that the pairing efficiency is below a first threshold and the resource usage is higher than a second threshold, adjusting one or more pairing criteria to increase MIMO pairing; and responsive to determining that the pairing efficiency is above a third threshold and the resource usage is below a fourth threshold, adjusting one or more pairing criteria to reduce MIMO pairing.

16. The processing node of claim 15, wherein adjusting one or more pairing criteria to increase MIMO pairing comprises one or more of: reducing an angular separation required for MIMO pairing, reducing a threshold data buffer requirement for MIMO pairing, or reducing a minimum number of wireless devices required to form a MIMO group.

17. The processing node of claim 15, wherein adjusting one or more pairing criteria to reduce MIMO pairing comprises one or more of: increasing an angular separation required for MIMO pairing, increasing a threshold data buffer requirement for MIMO pairing, or increasing a minimum number of wireless devices required to form a MIMO group.

* * * * *